United States Patent [19]
Chivari

[11] 3,782,214
[45] Jan. 1, 1974

[54] REMOTELY CONTROLLABLE CHANGE SPEED GEAR

[75] Inventor: Ilie Chivari, Wanne-Eickel, Germany

[73] Assignee: Firma Hackforth & Co. Maschinen-Fabrik, Wanne-Eickel, Germany

[22] Filed: Dec. 10, 1971

[21] Appl. No.: 206,599

[30] Foreign Application Priority Data
Dec. 10, 1970 Germany.................. P 20 60 787.8

[52] U.S. Cl. ................................................. 74/331
[51] Int. Cl. ............................................. F16h 3/08
[58] Field of Search ...................................... 74/331

[56] References Cited
UNITED STATES PATENTS
3,130,595  4/1964  Cook .................................. 74/331
3,080,773  3/1963  Lee et al............................ 74/331 X Primary Examiner—Leonard H. Gerin
Attorney—Howard H. Darbo et al.

[57] ABSTRACT

Input and output shafts are positioned coaxially in a gear box housing with four auxiliary shafts positioned about and parallel thereto. A gear on the output shaft is engaged by respective gears on the auxiliary shafts. Clutches are associated with each of the auxiliary shafts and have their output parts engaging the respective auxiliary shafts. The input part of one clutch is gear connected to the input shaft and the remaining input parts are in series in a speed reducing gear train from the input part of the one clutch. The gear train is rotatably mounted on the output shaft and the various auxiliary shafts.

15 Claims, 10 Drawing Figures

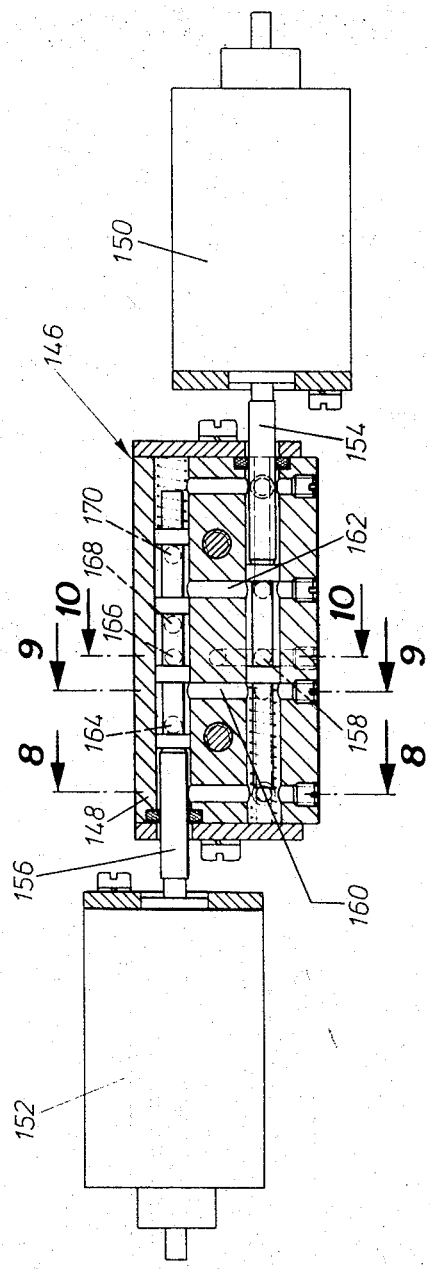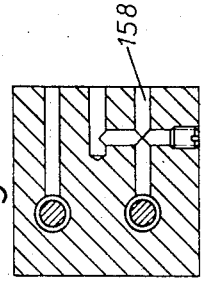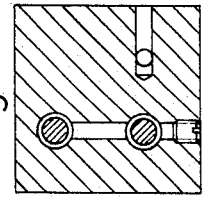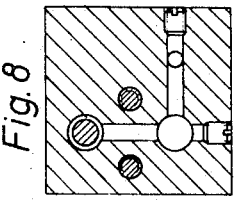

REMOTELY CONTROLLABLE CHANGE SPEED GEAR

BACKGROUND AND SUMMARY OF THE INVENTION

This invention relates to remotely controllable change speed gear box preferably controllable by pressure fluid, in which a plurality of clutch halves are in driving connection with an input shaft through gear drives with stepwise varied transmission ratio and the other clutch halves are in driving connection with an output shaft, and in which the individual clutches can be actuated optionally by pressure fluid supply. In order to attain a large range of transmission reduction ratios, provision is made that the driving connection of the clutch halves with the input shaft is established in that the rotation of the one clutch half is effective to drive the clutch half of the next transmission stage through an intermediate gear. In prior art gears this is accomplished in such a manner that the one clutch half designed as clutch drum has a toothed shoulder on one side and a collar provided with an internal teeth on the other side, and that between two respective clutch drums an intermediate gear is supported eccentrically to the output shaft on its peripheral area and with internal teeth is in mesh with the toothed shoulder of the one, and with external teeth provided adjacent the peripheral area is in mesh with the internally toothed collar of the neighboring clutch drum. A pump in the form of a geared pump and acting as a source of pressure fluid is connected with the input shaft.

By the German Documents placed open No. 1,550,695 a remotely controllable change speed gear of similar type has been used in which the clutches are mounted on auxiliary shafts which clutches are coupled with the input shaft through gear drives with different transmission. On each auxiliary shaft a clutch is mounted including a clutch half running loosely on the auxiliary shaft and further including a clutch half keyed to the auxiliary shaft. The clutch halves running loosely on each auxiliary shaft are coupled with the input shaft through clutch gear drives. The auxiliary shafts are arranged parallelly to the input shaft and to the coaxial output shaft around the same, and that is on a circle concentric to the input shaft and having an annular distance of 60°. The distance of the input shaft from the auxiliary shafts becomes equal to the distance between the auxiliary shafts so that similar gear drive sets can be applied between the input shaft and an auxiliary shaft and between the individual auxiliary shafts. The output shaft and the input shaft can be coupled directly with each other through a main clutch. The output shaft is designed as hollow shaft and surrounds part of the input shaft.

The last mentioned construction still requires certain improvements which are attained by the present invention. In the prior art arrangement, gear drive connections are provided between the auxiliary shafts. This requires intermediate gear drive pairings for the reversal of the speed. Furthermore, in the prior art construction it is necessary to arrange the auxiliary shafts on a circle of an angular distance of 60°, which requires a high precision in the manufacture. If the input shaft is coupled directly with the output shaft through the main clutch, then clutch drums on the auxiliary shafts are caused to assume a higher speed through their clutch gear drives than the drive speed. The gear, specifically in apparatus for great outputs, is limited by the tooth flank sliding speed. In the prior art construction the auxiliary shafts are driven at different speeds, leading to a certain disturbance. When using the gear as a washing machine gear, the gear primarily operates at a maximum reduction, thus small output speed. A great speed difference is developed at the main clutch, when leads to an undesired strain and heat development when the clutch is disengaged. Moreover, in the prior art construction it has been proven to be disadvantageous that the output shaft extends partially across the input shaft. When driven through V-belts, the output shaft is subjected to bending so that high frictional resistances are encountered between the input shaft and the output shaft.

It is an object of this invention to provide a remotely controllable change speed gear which by avoiding the described disadvantages also permits a change-over of the output speed within large limits.

The change speed gear according to the invention is characterized in that the input shaft and a coaxial output shaft as well as auxiliary shafts parallel to the input shaft and the output shaft are supported in a gear housing. The remotely controllable clutches include one input clutch half each on the input side and one output clutch half each with the output halves being keyed to the associated auxiliary shaft. One of the input clutch halves has teeth in mesh with a gear on the input shaft. A pair of gears is connected with the input clutch halves on each of the auxiliary shafts. Axially displaced pairs of interconnected gears are rotatably supported on the output shaft and one gear each of each of these pairs is in mesh with a gear on a respective one of the auxiliary shafts. Each auxiliary shaft has a respective output gear keyed thereto and these output gear wheels are in mesh with a common gear secured to the output shaft.

In constrast to the change speed gear according to the German Documents placed open No. 1,550,695, in the arrangement according to this invention the clutches are arranged in front of the transmission gear drive on their auxiliary shafts. This involves the following advantages:

a. The input clutch halves are directly connected with the input shaft through corresponding gear reductions and thus can be driven already at the first gear pairing substantially below the drive speed and at constant speed. Such a construction provides definite functional conditions and permits the construction of the necessary restoring forces in order to decouple the clutch disks.

b. The gear pairings of the input clutch halves can be maintained at the highest speed of the gear below the maximally permissible limit of the tooth flank sliding speed. This advantage is of highest significance particularly in apparatus of great output.

A direct gear connection between the auxiliary shafts is omitted. The advantage that similar gear wheel sets can be used between the auxiliary shafts and the input shaft is however maintained if the auxiliary shafts are all arranged at the same distance from the input shaft, the output shaft respectively. All of the auxiliary shafts are coupled with the output shaft through the output gears and always run at the same speed. Thereby, a quiet run of the gear is obtained in the low speed range.

Advantageously, the arrangement is provided such that the gear pairs on the output shaft and the on the auxiliary shafts are constituted by a relatively larger gear and a relatively smaller gear which are interconnected, and that a relatively larger gear on an auxiliary shaft is in mesh with a smaller gear on the output shaft and the associated smaller gear on the auxiliary shaft is in mesh with the larger gear wheel of the axially adjacent pair.

In this manner a geometrical stepping of the speeds is obtained upon engagement of the clutches on the different auxiliary shafts.

The remotely controllable clutches can substantially be arranged in one plane. The clutches are advantageously hydraulically engageable mutiple disk clutches. To produce oil pressure for the control of the clutches a crescent-type pump can be provided which is driven by one of the auxiliary shafts and supplies pressure oil into a pressure oil conduit through a pair of relief valves independently of the direction of drive.

In a preferred embodiment of the invention there are four auxiliary shafts thus providing four speeds. The pressure oil is conducted through a distributor having two slide valves controllable by stroke magnets to supply the oil optionally to one of the four clutches. The distributor has four outlets (each leading to a respective clutch) arranged in two pairs. One of the slide valves in its two positions conducts the pressure oil stream to a respective one of two pairs and the second slide valve in its two positions selects to which of the two outlets making up that pair the pressure oil stream is to go.

It is further shown to be advantageous that the greatest speed reduction is associated to the state of the switchoff of the two stroke magnets. This offers the advantage that in the case of a washing machine gear the stroke magnets need not be excited for the greatest part of the operating time. Moreover, there is the advantage that in the case of current failure a rapid deceleration of the speed is effected by engagement of the clutch for the lowest speed.

DESCRIPTION OF THE DRAWINGS

FIG. 7 illustrates the control unit in the gear of FIGS. 1 to 6.

FIG. 8 illustrates a section along the line 8—8 of FIG. 7.

FIG. 9 illustrates a section along the line 9—9 of FIG. 7, and

FIG. 10 illustrates a section along the line 10—10 of FIG. 7.

DESCRIPTION OF SPECIFIC EMBODIMENT

Figure 1:
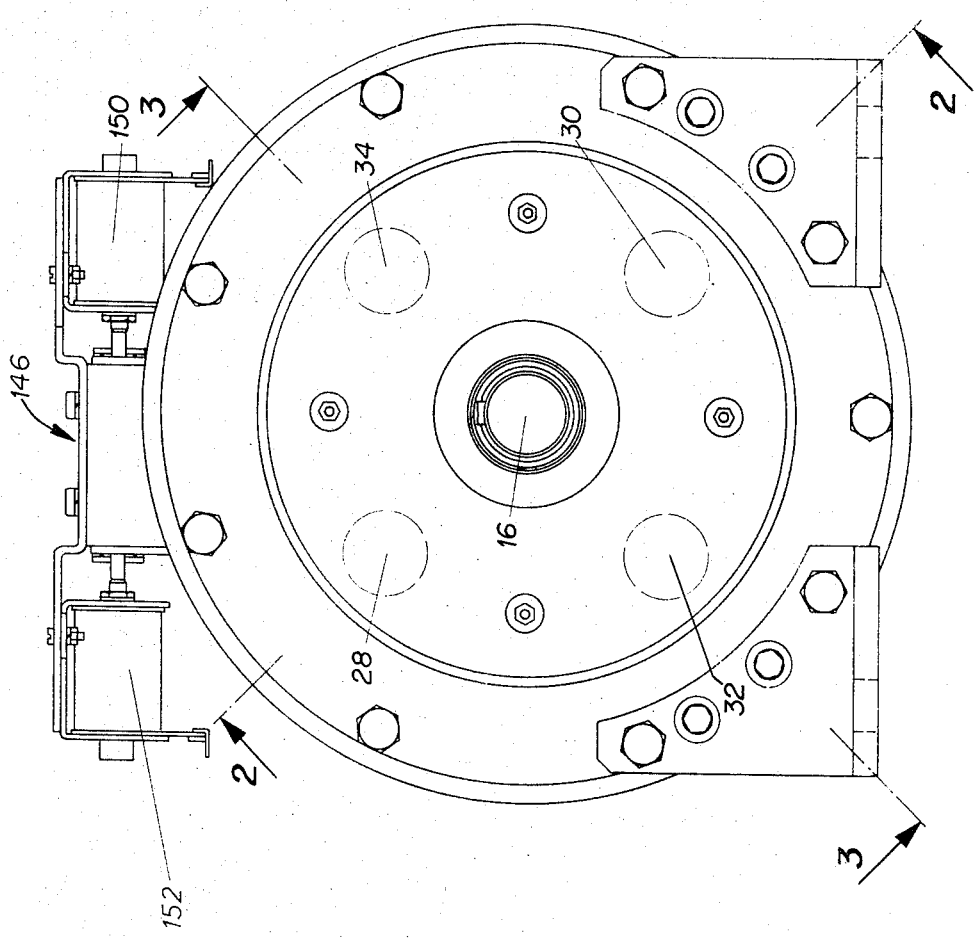
FIG. 1 is a front view of a change speed gear according to the invention.

An input shaft 12 is supported in a bearing 14 in a gear housing 10. An output shaft 16 is supported in a bearing 18 in the housing, extends axially through the housing and protrudes into a recess 20 of the input shaft in which it is supported by means of bearings 22 and 24. The input shaft 12 is coupled with a drive motor (not shown). Four auxiliary shafts 28, 30 (FIG. 2) and 32, 34 (FIG. 3) are supported in the housing 10 at equal distances around the output shaft 16 and parallel to it. Output gears 36, 38, 40, 42 (seen at the right end in FIGS. 2 and 3) are keyed to the auxiliary shafts. The output gears are all always in mesh with a gear 44 on the output shaft 16. Gear 44 is keyed to the output shaft.

An input clutch half 46 and having the form of a clutch cylinder is rotatably supported on auxiliary shaft 28. Input clutcb half 46 is rigidly connected with a gear 48. The gear 48 is in mesh with a gear 50 which is keyed to the input shaft 12. Thus the input clutch half 46 rotates constantly with the rotation of the input shaft 12.

Figure 4:
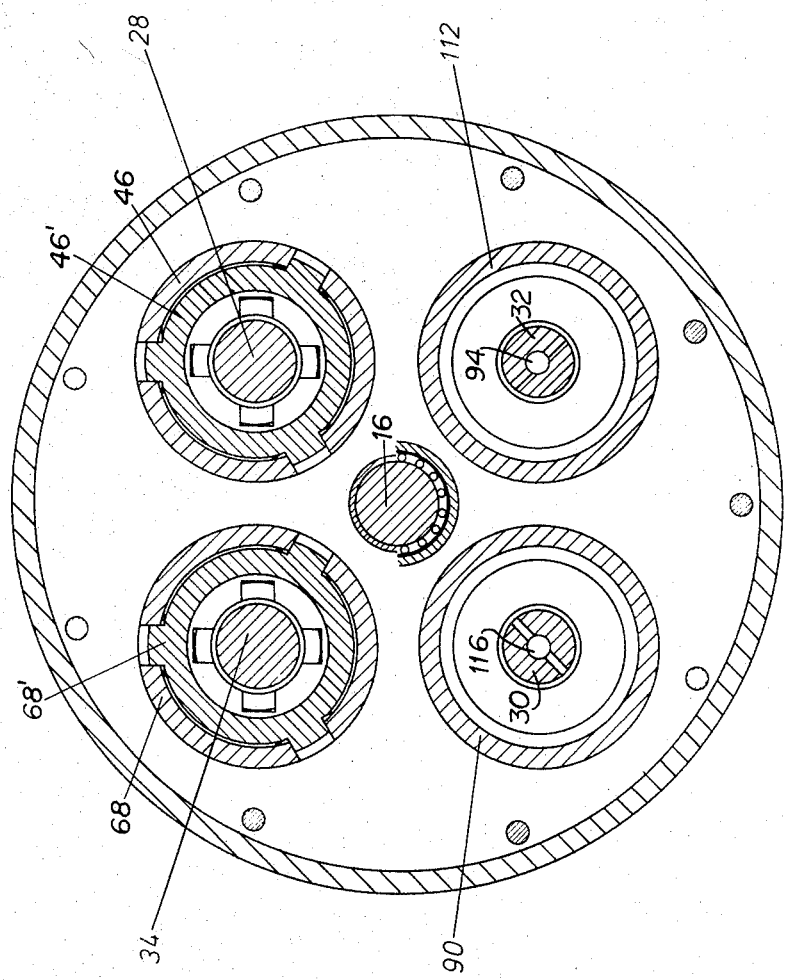
FIG. 4 illustrates a section along the line 4—4 of the FIGS. 2 and 3.

An output clutch half 52 constituting a disk carrier is keyed to the auxiliary shaft 28. When the clutch is engaged, the input clutch half is coupled through clutch disks 54 with the output clutch half 52 and therewith with the auxiliary shaft 28. The clutch is engaged by introducing oil under pressure through a conduit 58 into the cylinder space 56 so that the piston 60 presses the clutch disks 54 against the pressure plate 46'. As will be seen in FIGS. 2 and 4, pressure plate 46' is rotationally locked to input clutch half 46 and thus functionally forms a part thereof.

Input clutch half 46 is connected to a gear 62 and the two are rotatably supported on the auxiliary shaft 28 gear 62 meshes with a gear 64 of a pair of rigidly interconnected gears 64, 66. The gear 64 has a greater diameter than the gears 66. The gears wheels 64 and 66 are rotatably supported on the output shaft 16.

Figure 3:
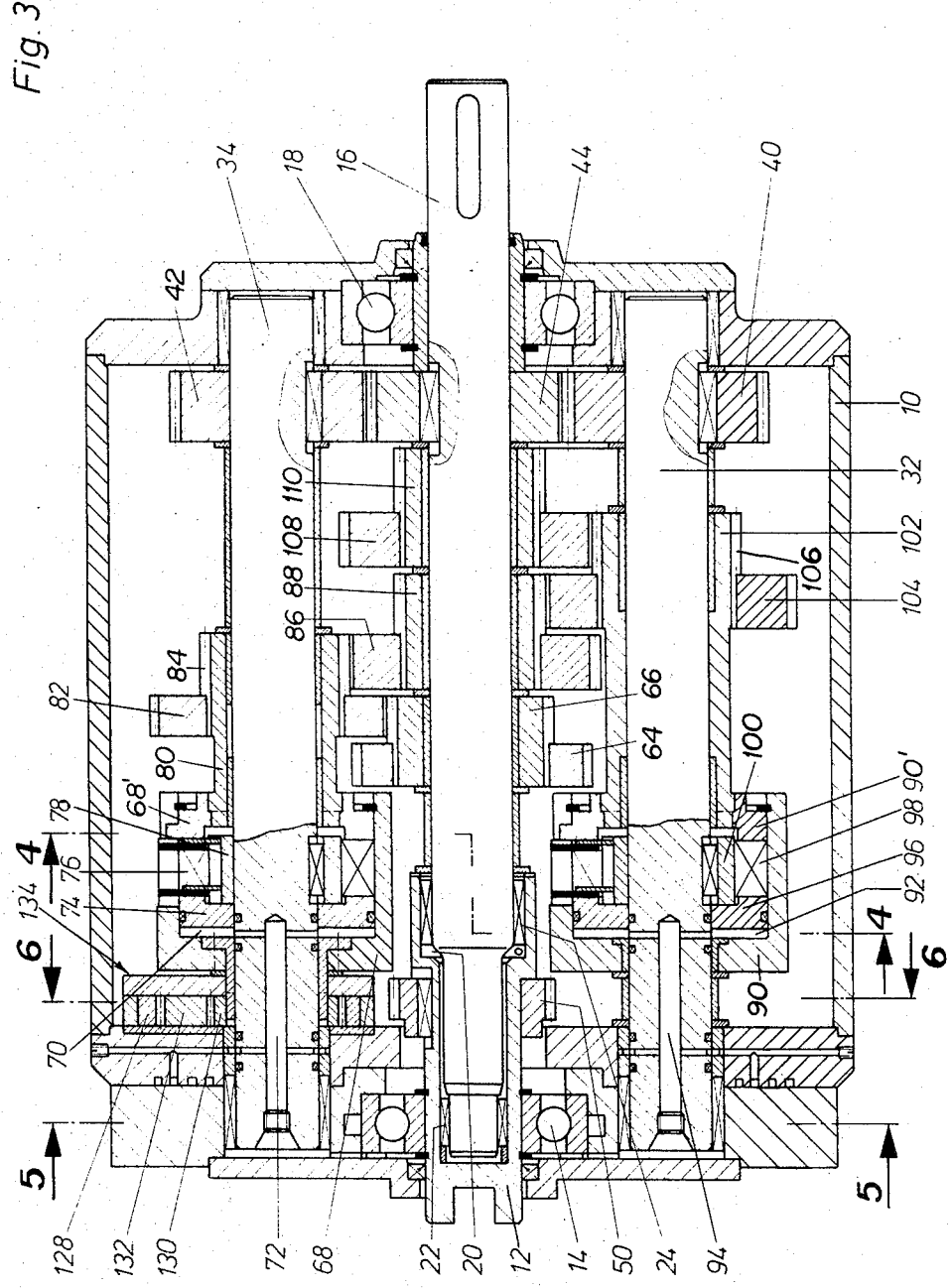
FIG. 3 illustrates a section along the line 3—3 of FIG. 1.

An input clutch half 68 is rotatably supported on the auxiliary shaft 34 (FIG. 3). A channel 72 extends longitudinally in the auxiliary shaft 34. Upon introduction of pressure oil through channel 72 into the cylinder chamber 70 clutch disks 76 are pressed together against the pressure plate 68' by a piston 74. Thus the input clutch half 68, is coupled with the output clutch half 78 which is keyed to the auxiliary shaft 34.

A sleeve 80 surrounding the auxiliary shaft 34 is mounted on the input clutch half 68. A gear wheel pair comprised of a gear 82 of larger diameter and a gear 84 of smaller diameter is connected with the sleeve 80. Gear 82 is in mesh with the gear 66 on the output shaft 16. Gear 84 is in mesh with a gear 86 of a pair of gears 86 and 88 on the output shaft, the gear 86 again having the greater diameter and the gear 88 the smaller diameter gears 86 and 88 are interconnected.

The arrangement on the auxiliary shaft 32 (FIG. 3) is similar to that on the auxiliary shaft 34. An input clutch half 90 forms a clutch cylinder. Pressure oil is conducted into a cylinder space 92 through a channel 94. This then moves the piston 96 to the right to press clutch disks 98 between it and the pressure plate 90'. This couples the input clutch half 90, 90' with an output clutch half 100 which is keyed to the auxiliary shaft 32.

A sleeve 102, which is connected with the input clutch half 90, surrounds the auxiliary shaft 32 and carries a pair of gears comprised of a larger gear 104 and a smaller gear 106. Gear 104 meshes with the gear 88. Gear 106 meshes with a gear 108 on the output shaft. The gear 108 constitutes the larger gear of a pair of gears 108 and 110 rotatably supported on the output shaft 16.

An input clutch half 112 is mounted on auxiliary shaft 30. Clutch half 112 is designed in the same manner as the clutch half 90 on the auxiliary shaft 32. Pressure oil can be introduced into a cylinder space 114 through a conduit 116. The piston 118 then presses clutch disks 120 between it and the pressure plate 112'. This couples the input clutch half 112 with an output clutch half 122. The output clutch half 122 is keyed to the auxiliary shaft 30.

Figure 5:
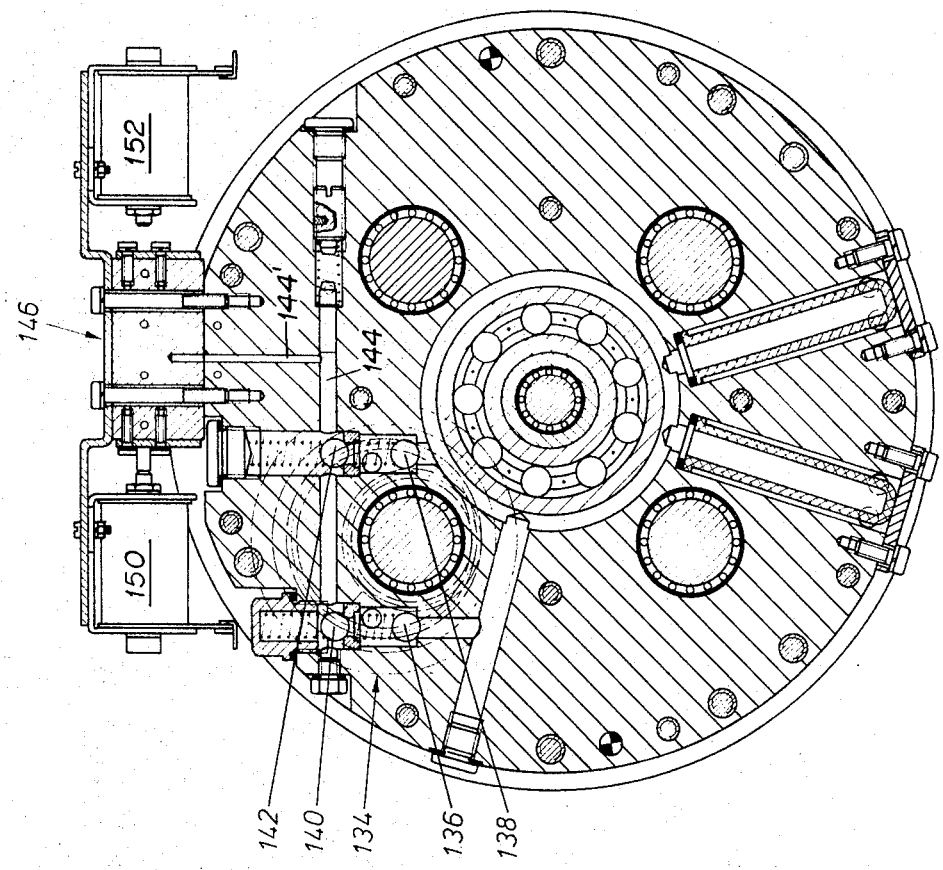
FIG. 5 illustrates a section along the line 5—5 of FIG. 3.
Figure 6:
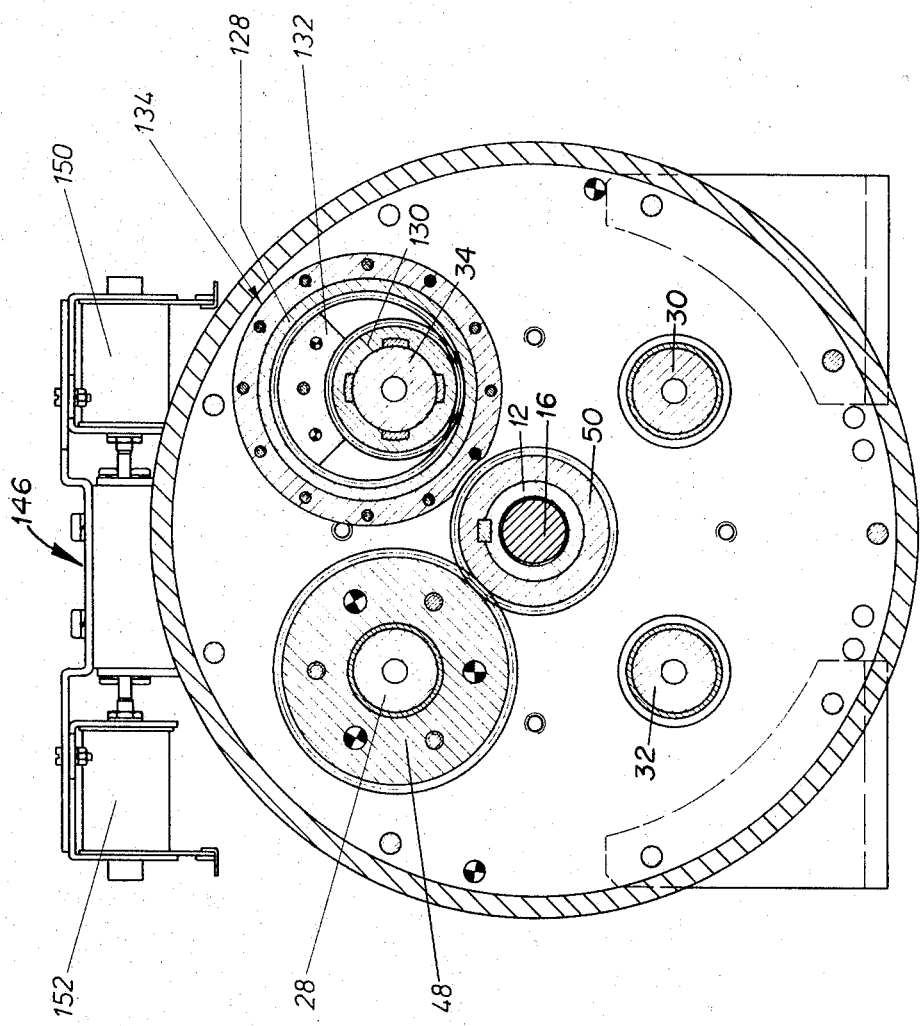
FIG. 6 illustrates a section along the line 6—6 of FIG. 3.

A sleeve 124 surrounds the auxiliary shaft 30 and carries a gear 126. Sleeve 124 is secured to the clutch input half 112. As can be seen from FIG. 2, gear 126 makes with the smaller gear 110 of the pair of gears 108 and 110. A gear pump generally 134 (FIGS. 5 and 6) is mounted on the auxiliary shaft 34. This pump is designed as a so-called crescent-type pump, i.e. a pump with an internal ring gear 128 and an external gear 130 of a smaller diameter. The crescent-shaped space between the gears is filled out by a body 132 stationary with respect to the housing. The pump has two ports which alternatively serve as intake and discharge ports depending on the direction of rotation of the pump. Check valves 136 and 140 communicate with one port and check valves 138 and 142 communicate with the other port. The pump 134 sucks oil from the housing interior (serving as a sump) through check valves 136 or 138 (FIG. 5) depending on the direction of rotation of the drive motor. The pressure oil is discharged through check valve 140 or check valve 142 into a pressure oil conduit 144, 144' which leads to a control unit generally 146. The control unit 146 can best be seen from the FIGS. 7 to 10. It includes a control block 148 and two stroke magnets 150, 152. Each of the stroke mangets 150 and 152 controls a slide valve 154 and 156 respectively.

The pressure oil from the conduits 144, 144' flows into the control block through conduit 158. Depending on the state of excitation of the stroke magnet 150 and therewith the position of the slide valve 154, the pressure oil flows through a The distribution from channels 160 or 162, as the case may be, depends on the state of excitation of stroke magnet 152 and thus the position of slide valve 156. The oil may go from channel 160 to one of the two outlets 164 or 166 or it may go from the channel 162 to the outlet 168 or to the outlet 170. These outlets 164, 166, 168, 170 are connected with the control channels 58, 72, 94, 116 for the hydraulically engageable clutches.

In the position illustrated in FIG. 7 in which both stroke magnets 150 and 152 are not excited the pressure oil flows from the channel 158, to the right along the slide valve 154, through the channel 162, to the right along slide valve 156 and to the outlet 170. This outlet is connected with the channel 116 in the auxiliary shaft 30 and causes engagement of the hydraulically actuated clutch 112, 122. This corresponds to the slowest output speed of the gear box.

Figure 2:
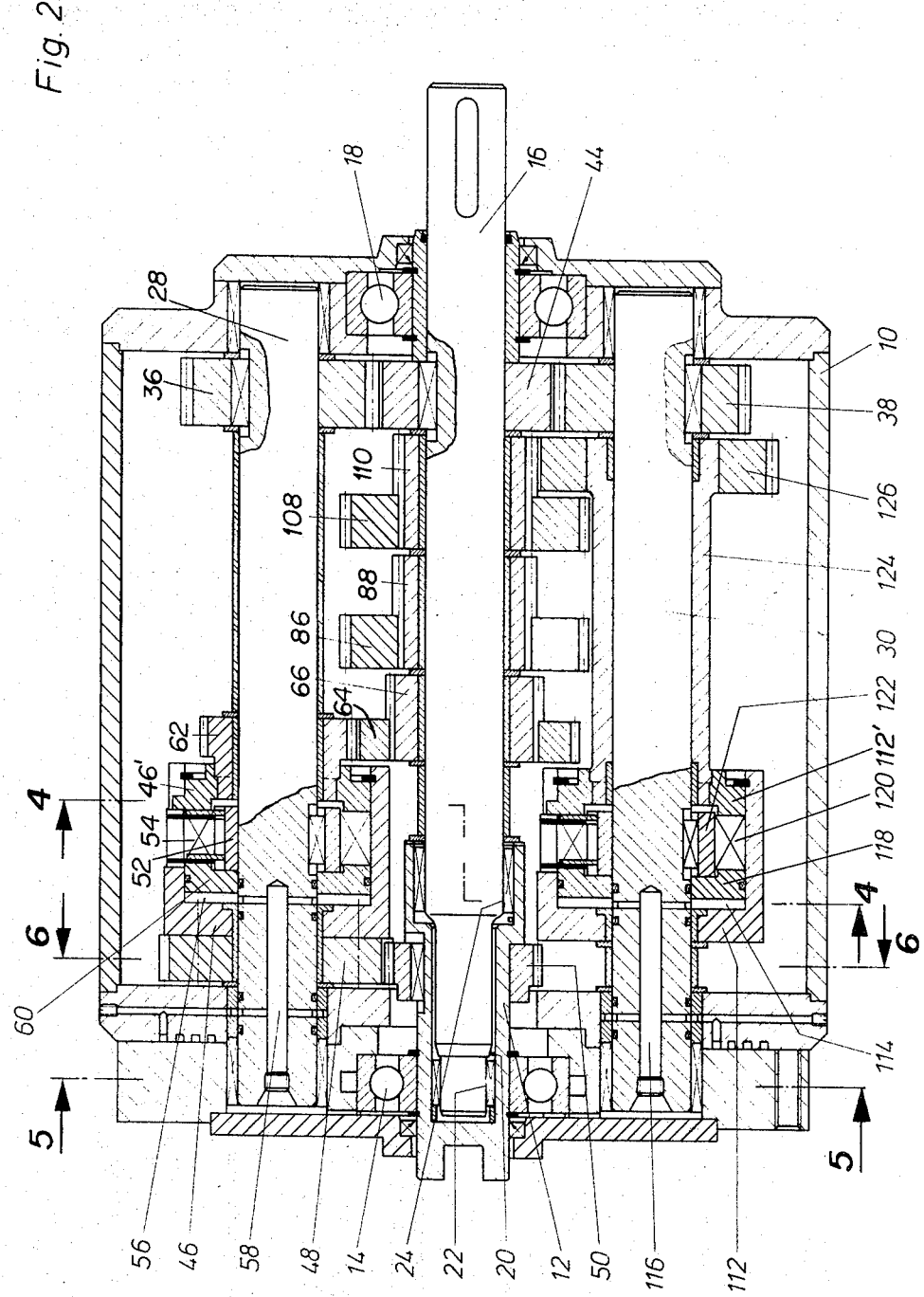
FIG. 2 illustrates a section along the line 2—2 of FIG. 1.

The described arrangement operates as follows: The input clutch halves are driven by the input shaft 12 with geometrically stepped speed, and the drive of the input clutch half 46 (FIG. 2) is effected directly from the input shaft 12 through the gears 48, 50, where an initial speed reduction takes place. The input clutch half 46 drives the input clutch half 68 through gears 62, 64, 66 and 82 (FIGS. 2 and 3). This results in a further speed reduction. The input clutch half 68 in turn drives the input clutch half 90 through gears 84 and 86 as well as gears 88 and 104, the drive of the input clutch half 90 being effected with further speed reduction relative to the input clutch half 68. The input clutch half 90 drives the clutch half 112 (FIG. 2) with further speed reduction through gears 106, 108 and 110 and 126. Thus, the clutch half 112 rotates at the slowest speed. Depending on which one of the clutches is engaged, the respective auxiliary shaft 28, 30, 32, 34 is carried along at the speed of the associated input clutch half. This speed is transmitted to the gear 44 on the output shaft 16 by gear 36, 38, 40 or 42 (depending upon which auxiliary shaft is being driven) and determines the output speed. All auxiliary shafts rotate at this speed. By appropriate excitation of stroke magnets 150 and 152 and thus a setting of the distributor, one of a total of four gear speeds can be selected. When both stroke magnets 150 and 152 are deenergized, the "first speed," thus the gear speed with the greatest speed reduction is established. When the stroke magnet 150 the "second speed" is obtained. When switching on the stroke magnet 152 alone is energized the "third speed" is produced and when both stroke magnets 150 and 152 are energized the gear speed with the least speed reduction (thus the "fourth speed") is obtained. This arrangement ensures an automatic change-over to the lowest output shaft speed and a deceleration in case of current failure.

The invention is claimed as follows:

1. A remotely controllable change speed gear in which a plurality of clutch halves are in driving connection with an input shaft through gear drives with stepwise varied transmission ratio and the other clutch halves are in driving connection with an output shaft and the individual clutches can be actuated optionally, the driving connection of the clutch halves with the input shaft being established in that the rotation of the one clutch half is effective to drive the clutch half of the next transmission stage through an intermediate gear, characterized in that the input shaft and a coaxial output shaft as well as auxiliary shafts parallel to the input shaft and the output shaft are supported in a gear housing, that the remotely controllable clutches include one input clutch half and one output clutch half each keyed to the associated auxiliary shaft, one of the input clutch halves having teeth in mesh with a gear wheel on the input shaft, that a pair of gear wheels is connected with the input clutch half on each of the auxiliary shafts, that axially displaced pairs of interconnected gear wheels are rotatably supported on the output shaft and one gear wheel each of each of these pairs is in mesh with a gear wheel on a respective one of the auxiliary shafts, and that one output gear wheel each is keyed to the auxiliary shafts and these output gear wheels are in mesh with a common gear wheel on the output shaft.

2. A remotely controllable change speed gear as claimed in the claim 1,
    characterized in that the gear wheel pairs on the output shaft and the gear wheels on the auxiliary shafts are constituted by a respective gear one and a respective smaller gear wheel which are interconnected, and that a respective greater gear wheel on an auxiliary shaft is in mesh with a smaller gear wheel on the output shaft and the associated smaller gear wheel on the auxiliary shaft is in mesh with the greater gear wheel of the axially adjacent pair, in the 3. A remotely controllable change speed gear as claimed in the claim 1,
characterized in that the remotely controllable clutches are substantially arranged in one plane.

4. A remotely controllable change speed gear as claimed in any one of the claims 1,
characterized in that the clutches are hydraulically engageable multiple disk clutches.

5. A remotely controllable change speed gear as claimed in the claim 4,
characterized in that for producing oil pressure for the control of the clutches a crescent-type pump is provided which is driven by one of the auxiliary shafts and supplies pressure oil into a pressure oil conduit through a pair of relief valves independently of the direction of drive.

6. A remotely controllable change speed gear as claimed in the claim 5,
characterized in that four auxiliary shafts are provided according to four speeds and that the pressure oil is conducted through a distributor with two slide valves controllable by stroke magnets optionally to one of the four clutches, the one slide valve in its two positions conducting the pressure oil stream to a respective one of two pairs of outlets and the second slide valve in its two positions releasing a respective outlet of each pair for the said pressure oil stream.

7. A remotely controllable change speed gear as claimed in the claim 6,
characterized in that the speed with the strongest reduction is associated to the state of switchoff of the two stroke magnets.

8. In a remotely controllable change speed gear box comprising a housing, an input shaft in the housing, an output shaft in the housing, a plurality of clutches and gear means interconnecting said shafts for driving the output shaft from the input shaft at different speeds depending upon which clutches are engaged and disengaged, each clutch comprising an input clutch part and an output clutch part, said input and output shafts being coaxial, and a plurality of auxiliary shafts positioned parallel to the axis of the input and output shafts, the improvement comprising:
each of said auxiliary shafts being associated with a respective one of said clutches, the output part of the respective clutch being keyed to the associated auxiliary shaft, a part of said gear means being arranged in a series between the input shaft and the input parts of each of the clutches so that the clutches are in series in the gear train formed by said part of said gear means, thus said gear train including a first plurality of interengaging gears one of which is attached to the input shaft and one of which is attached to the input part of the first of said series of clutches, for each succeeding clutch of the series said gear train including a second plurality of gears one of said second plurality of gears being secured to the input part of that succeeding clutch and another of which is secured to the input part of the preceding clutch of the series, said one of said second plurality of gears being mounted on the respective auxiliary shaft associated with said succeeding clutch and being rotatable with respect to said respective auxiliary shaft, said another of said second plurality of gears being mounted on the respective auxiliary shaft associated with said preceding clutch of the series and being rotatable with respect to said respective auxiliary shaft, said second plurality of gears including a pair of interconnected gears mounted on the output shaft and rotatable with respect thereto, said gear means including driven gear secured to the output shaft, said gear means including drive gears for each of the auxiliary shafts, secured to the respective auxiliary shaft and in driving engagement with said driven gear.

9. In a change speed gear box as set forth in claim 8, wherein within said second plurality of gears each gear, in toothed engagement with a second gear in the direction of drive, is smaller than said second gear thereby providing a speed reduction from the preceding clutch of the series to the succeeding clutch.

10. In a change speed gear box as set forth in claim 9, wherein said clutches are all positioned substantially in a common plane normal to said axis.

11. In a change speed gear box as set forth in claim 10, wherein each of said clutches in a multiple disk clutch and includes a hydraulic cylinder and piston to actuate the engagement of the clutch disks.

12. In a change speed gear box as set forth in claim 8, wherein each of said clutches in a multiple disk clutch and includes a hydraulic cylinder and piston to actuate the engagement of the clutch disks.

13. In a change speed gear box as set forth in claim 12, including a crescent-type hydraulic pump operatively connected to one of the auxiliary shafts to be driven thereby, said pump having two ports one of which serves as the intake port and the other of which as the discharge port and vice versa depending on the direction of rotation of the pump, a sump, and means communicating with said ports and said cylinders of the clutches to supply oil from the pump to the cylinders, said communicating means including a supply conduit, check valves between said ports respectively and said conduit to permit the flow of hydraulic fluid only toward said conduit from said ports, and check valves between said ports respectively and said sump to permit the flow of hydraulic fluid only away from said sump, whereby said pump supplies hydraulic fluid to said cylinders regardless of the direction of rotation thereof.

14. In a change speed gear box as set forth in claim 13, wherein there are four clutches and four auxiliary shafts thereby providing four speeds, said communicating means includes a distributor and four conduits each connected to the distributor and a respective one of the cylinders, said distributor having two slide valve means, a first of said slide valve means including an intake port communicating with the supply conduit and two discharge ports, the second slide valve means having two intake ports each communicating with a respective discharge port of the first slide valve means and two pair of discharge ports with each pair being associated with a respective one of its intake ports, each discharge port of the pairs communicating with a respective one of said four conduits, said first slide valve means directing hydraulic fluid from its intake port to one or the other of its discharge ports depending on the setting of the valve means, said second slide valve means, depending upon the setting thereof, directing hydraulic fluid from its intake ports to one or the other of the discharge ports of said pairs associated with the intake ports.

15. In a changeable speed gear box as set forth in claim 14, including two stroke magnet means, each associated with a respective valve means to operate the respective valve means, said stroke magnet means being electrically energized, one of said clutches when engaged providing the slowest speed of the output shaft, said communicating means directing the hydraulic fluid to said one clutch when said magnet means are deenergized to thereby engage said one clutch in that event.

* * * * *

UNITED STATES PATENT OFFICE
CERTIFICATE OF CORRECTION

Patent No. 3,782,214　　　　　　　Dated Jan. 1, 1974

Inventor(s) Ilie Chivari

It is certified that error appears in the above-identified patent and that said Letters Patent are hereby corrected as shown below:

Col. 1, line 27, insert --clutch drum-- after "one".
Col. 2, line 7, "when" should be --which-- .
Col. 2, line 24, delete "on the input side".
Col. 2, line 61, after "input shaft" delete "," and insert --and-- .
Col. 2, line 67, after "shaft and the" insert --gears-- .
Col. 3, line 5, after "larger gear" delete "wheel".
Col. 3, line 12, "mutiple" should be --multiple-- .
Col. 4, line 5, "rignt" should be --right-- .
Col. 4, line 10, delete "and" before "having" .
Col. 4, line 12, "clutcb" should be --clutch-- .
Col. 4, line 29, insert a period (.) after "28".
Col. 4, line 30, "gear" first occurrence should be --Gear--.
Col. 4, line 31, "64, 66" should be --64 and 66-- .
Col. 4, line 32, delete "wheels".
Col. 4, lines 49,50, after the phrase "the smaller diameter" insert a period (.).
Col. 4, line 50, "gears" should be --Gears-- .

Col. 5, line 13, "makes" should be --meshes-- .
Col. 5, line 40, insert --channel 160 or a channel 162.-- before "The distribution".
Col. 5, line 50, "input clutch" should read --clutch input-- .
Col. 6, line 4, insert --input-- before "clutch half" .
Col. 6, line 19, after "150" insert --is energized-- .
Col. 6, line 20, after "When" delete "switching on".
Col. 7, line 1, after "pair" delete "in the" and substitute a period (.).
Col. 7, line 7, "claims 1" should be --claim 1-- .
Col. 8, line 23, after "said clutches", "in" should be --is-- .
Col. 8, line 27, after "said clutches", "in" should be --is-- .

Signed and sealed this 15th day of October 1974.

(SEAL)
Attest:

McCOY M. GIBSON JR.　　　　　　　C. MARSHALL DANN
Attesting Officer　　　　　　　　　Commissioner of Patents